United States Patent
Hu et al.

(10) Patent No.: US 11,360,729 B2
(45) Date of Patent: Jun. 14, 2022

(54) METHOD AND APPARATUS FOR CONTROLLING SYNCHRONIZATION OUTPUT OF DIGITAL MATRIX, AND ELECTRONIC DEVICE

(71) Applicant: HANGZHOU HIKVISION DIGITAL TECHNOLOGY CO., LTD., Hangzhou (CN)

(72) Inventors: Chunbo Hu, Hangzhou (CN); Zhenxiao Yue, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 227 days.

(21) Appl. No.: 16/473,907

(22) PCT Filed: Oct. 20, 2017

(86) PCT No.: PCT/CN2017/107004
§ 371 (c)(1),
(2) Date: Jun. 26, 2019

(87) PCT Pub. No.: WO2018/121012
PCT Pub. Date: Jul. 5, 2018

(65) Prior Publication Data
US 2019/0339924 A1 Nov. 7, 2019

(30) Foreign Application Priority Data
Dec. 29, 2016 (CN) .......................... 201611252456.2

(51) Int. Cl.
*G06F 3/14* (2006.01)
*G06V 20/40* (2022.01)
*G11B 27/031* (2006.01)

(52) U.S. Cl.
CPC ............ *G06F 3/1446* (2013.01); *G06V 20/49* (2022.01); *G11B 27/031* (2013.01)

(58) Field of Classification Search
CPC ....... G06F 13/14; G06F 3/1446; H04N 5/268; H04N 5/04; H04N 7/52; H04N 21/242;
(Continued)

(56) References Cited

U.S. PATENT DOCUMENTS 9,832,507 B2 * 11/2017 Le Nerriec .......... H04N 21/439
9,973,795 B2 * 5/2018 Cunningham ....... H04N 21/242
                                                                725/90
(Continued)

FOREIGN PATENT DOCUMENTS

CN    101344707    1/2009
CN    102103826    6/2011
(Continued)

OTHER PUBLICATIONS

Dai Xin et al, Machine Translation of CN 104375789A, "Synchronous displaying method and system of tiled display screen," Published Feb. 25, 2015 (Year: 2015).*
(Continued)

*Primary Examiner* — Alvin H Tan
(74) *Attorney, Agent, or Firm* — Norton Rose Fulbright US LLP

(57) ABSTRACT

Disclosed is a method and apparatus for controlling a synchronous output of a digital matrix, and an electronic device, which relates to the field of multi-media technology and can control the synchronous outputs of output units. The method includes: when output units are activated or an individual output unit in the output units is re-activated after an abnormality occurs in this individual output unit, calibrating output start times and output periods of the output units such that the output start times of the output units are (Continued)

identical and the output periods of the output units are identical; receiving, by the output units, to-be-processed data based on the identical output start times; and after the to-be-processed data is received, controlling the output units to complete processing of the received to-be-processed data within a current output period, such that the output units output the processed data synchronously in a next output period.

11 Claims, 6 Drawing Sheets

(58) Field of Classification Search
CPC .............. H04N 21/43; H04N 21/4305; H04N 21/4307; G06V 20/49; G11B 27/031
See application file for complete search history.

(56) References Cited

U.S. PATENT DOCUMENTS

2014/0168277 A1  6/2014  Ashley et al.
2015/0106712 A1  4/2015  Oh et al.
2015/0281746 A1  10/2015  Lam

FOREIGN PATENT DOCUMENTS

| | | |
|---|---|---|
| CN | 102215319 | 10/2011 |
| CN | 102622196 | 8/2012 |
| CN | 102637120 | 8/2012 |
| CN | 103402140 | 11/2013 |
| CN | 104112441 | 10/2014 |
| CN | 104168426 | 11/2014 |
| CN | 104284098 | 1/2015 |
| CN | 104375789 | 2/2015 |
| CN | 105407252 | 3/2016 |
| CN | 105898230 | 8/2016 |

OTHER PUBLICATIONS

Qiang Wang et al, Machine Translation of CN 102622196A, "Network transmission based picture synchronization technology for multi-screen display system," Published Aug. 1, 2012 (Year: 2012).*
Extended European Search Report issued in corresponding European application No. 17886415.3, dated Dec. 16, 2019.
Office Action issued in Corresponding Chinese Patent Application No. 201611252456, dated Jul. 22, 2019.
International Search Report and Written Opinion issued in Corresponding International Patent Application No. PCT/CN2017/107004, dated Jan. 9, 2018.

* cited by examiner

METHOD AND APPARATUS FOR CONTROLLING SYNCHRONIZATION OUTPUT OF DIGITAL MATRIX, AND ELECTRONIC DEVICE

CROSS-REFERENCE TO RELATED APPLICATIONS

The present application is a national phase under 35 U.S.C. § 371 of International Application No. PCT/CN2017/107004, filed Oct. 20, 2017, which claims priority to Chinese patent application No. 201611252456.2 filed with the China National Intellectual Property Administration on Dec. 29, 2016 and entitled "Method and Apparatus for Controlling Synchronization Output of Digital Matrix, and Electronic Device", each of which are incorporated herein by reference in their entirety.

The present application claims the priority to a Chinese patent application No. 201611252456.2 filed with the China National Intellectual Property Administration on Dec. 29, 2016 and entitled "Method and Apparatus for Controlling Synchronization Output of Digital Matrix, and Electronic Device", which is incorporated herein by reference in its entirety.

TECHNICAL FIELD

The present application relates to the technical field of data transmission, and in particular to a method and apparatus for controlling a synchronous output of a digital matrix, and an electronic device.

BACKGROUND

A digital matrix usually has functions such as video matrix switching, audio matrix switching, and control information switching. The key to the digital matrix, as a video matrix, is to realize a switching output of an input video image, that is, to switch the video image from any one of input channels to any one of output channels for display. Usually, an M×N matrix can support M image inputs and N image outputs at the same time. In addition, the video matrix switching usually supports functions such as image segmentation/image stacking/splicing and roaming. A video integrated platform, a large screen controller and the like are typical digital matrices.

The synchronous output usually includes video matrix switching synchronous output, audio matrix switching synchronous output, video splicing and roaming synchronous output, and the like. The video matrix switching synchronous output usually refers to that one video input is switched to multiple video output units for display at the same time, and the image contents displayed by the video output units are synchronized. The audio matrix switching synchronous output generally refers to that one audio input is switched to multiple audio output units for output at the same time, and the sounds of the audio output units are synchronized. The video splicing and roaming synchronous output generally refers to that one video input image is divided into a plurality of video blocks according to preset parameters, and the plurality of video blocks are displayed on the video outputs, respectively. The images displayed simultaneously on respective display screens of the entire splicing screen belong to the same frame of video input image, and there is no image tearing and misalignment across screens.

In the prior art, the CN patent application CN104375789A published in 2015 discloses a synchronous display method and system for a splicing screen. In the synchronous display method and system, a video output unit starts a timer with a reference clock at the moment of receiving a synchronization response signal, wherein the synchronization response signal is fed back to each of video output units after a synchronous processing control unit receives synchronization request signals from all the video output units, and the reference clock is acquired from the synchronous processing control unit after the synchronous processing control unit is powered on; the video output unit generates a timing flag at a preset time interval using the timer; and the video output unit synchronously displays received image segmentation blocks according to the timing flag. However, when the synchronous processing control unit fails to receive a synchronization request signal sent by an individual video output unit, the displayed contents of all of the video output units are out of synchronization.

SUMMARY

Embodiments of the present application provide a method and apparatus for controlling a synchronous output of a digital matrix, and an electronic device, so as to solve the problem that the displayed contents of all of the video output units are not synchronized when an existing synchronous processing control unit fails to normally receive a synchronization request signal sent by an individual video output unit.

In a first aspect, an embodiment of the present application provides a method for controlling a synchronous output of a digital matrix, including:

when output units are activated or an individual output unit in the output units is re-activated after an abnormality occurs in this individual output unit, calibrating output start times and output periods of the output units such that the output start times of the output units are identical and the output periods of the output units are identical;

receiving, by the output units, to-be-processed data based on the identical output start times; and after the to-be-processed data is received, controlling the output units to complete the processing of the received to-be-processed data within a current output period, such that the output units output the processed data synchronously in a next output period.

In combination with the first aspect, in a first implementation of the first aspect, the calibrating output start times and output periods of the output units such that the output start times of the output units are identical and the output periods of the output units are identical includes:

broadcasting and configuring configuration parameters of the output units, such that the output periods of the output units are identical; and broadcasting an activation signal to the output units, and controlling the output units to simultaneously activate an output time sequence, such that the output start times of the output units are identical.

In combination with the first implementation of the first aspect, in a second implementation of the first aspect, the broadcasting and configuring configuration parameters of the output units such that the output periods of the output units are identical includes:

triggering the broadcasting of the configuration parameters of the output units by automatic detection or by receiving a calibration instruction input by a user manually;

controlling the configuration parameters of the output units to be reset; and controlling the output units to simultaneously configure the broadcasted configuration parameters.

In combination with the first aspect, in a third implementation of the first aspect, calibrating output start times and output periods of the output units such that the output start times of the output units are identical and the output periods of the output units are identical includes:

determining, according to a synchronous output group identifier to which each of the output units belongs, a synchronous output group to which each of the output units belongs;

broadcasting and configuring configuration parameters of output units in each of different synchronous output groups, such that output periods of the output units in this synchronous output group are identical; and broadcasting an activation signal to the output units in each of different synchronous output groups, and controlling the output units in this synchronous output group to simultaneously activate an output time sequence, such that the output start times of the output units in this synchronous output group are identical.

In combination with the third implementation of the first aspect, in a fourth implementation of the first aspect, receiving, by the output units, to-be-processed data based on the identical output start times includes:

controlling the output units in each of the synchronous output groups to simultaneously generate an output interruption based on the identical output start times; and when the output units in each of the synchronous output groups simultaneously generate the output interruption, synchronously triggering the output units in the synchronous output group to simultaneously receive respective to-be-processed data.

In combination with the third implementation of the first aspect, in a fifth possible implementation of the first aspect, the to-be-processed data is video frame divided blocks;

the step of receiving, by the output units, to-be-processed data based on the identical output start times includes:

transmitting the video frame divided blocks, and transmitting control information corresponding to the video frame divided blocks in broadcast manner;

controlling the output units in each of the synchronous output groups to simultaneously generate an output interruption based on the identical output start times; and when the output units in each of the synchronous output groups simultaneously generate the output interruption, synchronously triggering the output units in the synchronous output group to simultaneously acquire respective video frame divided blocks and control information corresponding to the video frame divided blocks.

In combination with the third implementation of the first aspect, in a sixth possible implementation of the first aspect, controlling the output units to complete the processing of the received to-be-processed data within a current output period, such that the output units output the processed data synchronously in a next output period includes:

controlling the output units in each of the synchronous output groups to complete the processing of the received to-be-processed data within a current output period, such that the output units in the synchronous output group output the processed data synchronously in a next output period.

In combination with the sixth implementation of the first aspect, in a seventh implementation of the first aspect, controlling the output units in each of the synchronous output groups to complete the processing of the received to-be-processed data within a current output period, such that the output units in the synchronous output group output the processed data synchronously in a next output period includes:

if the output units in the synchronous output group simultaneously receive respective to-be-processed data, completing, by the output units in the synchronous output group, the processing of the respective to-be-processed data before simultaneously generating a next output interruption, so as to trigger the output units in the synchronous output group to synchronously output data which has been processed completely in a previous period when the output units in the synchronous output group simultaneously generate the next output interruption;

wherein, when the output units in the synchronous output group simultaneously generate an output interruption, the output units in the synchronous output group start a new output period.

In combination with the seventh implementation of the first aspect, in an eighth implementation of the first aspect, the to-be-processed data includes a video frame, an audio frame, or a control data set;

the method further includes:

in case the to-be-processed data is a video frame or an audio frame, if the output units in the synchronous output group do not simultaneously receive respective video frames or audio frames, outputting previously outputted video frames or audio frames synchronously when the output units in the synchronous output group simultaneously generate the next output interruption; and in case the to-be-processed data is control data, if the output units in the synchronous output group do not simultaneously receive respective control data, outputting preset invalid control data or outputting no control data when the output units in the synchronous output group simultaneously generate the next output interruption.

In combination with the sixth implementation of the first aspect, in a ninth implementation of the first aspect, the to-be-processed data is video frame divided blocks;

the step of controlling the output units in each of the synchronous output groups to complete the processing of the received to-be-processed data within a current output period, such that the output units in the synchronous output group output the processed data synchronously in a next output period includes:

if the output units in the synchronous output group simultaneously acquire respective video frame divided blocks and control information corresponding to the video frame divided blocks, completing, by the output units in the synchronous output group, the processing of the respective video frame divided blocks before simultaneously generating a next output interruption, so as to trigger the output units in the synchronous output group synchronously output video frame divided blocks which have been processed completely in a previous output period when the output units in the synchronous output group simultaneously generate the next output interruption; and if the output units in the synchronous output group do not simultaneously acquire respective video frame divided blocks and control information corresponding to the video frame divided blocks, synchronously outputting the previously outputted video frame divided blocks when the output units in the synchronous output group simultaneously generate the next output interruption;

wherein, when the output units in the synchronous output group simultaneously generate an output interruption, the output units in the synchronous output group start a new output period.

In combination with the third implementation of the first aspect, in a tenth implementation of the first aspect, the method further includes:

controlling reference clocks of the output units in each of the synchronous output groups when the output units in the synchronous output group are operating, such that the reference clocks of the output units in the synchronous output group are identical in phase and frequency.

In a second aspect, an embodiment of the present application provides an apparatus for controlling a synchronous output of a digital matrix, including:

a synchronous output calibration unit, configured for, when output units are activated or an individual output unit in the output units is re-activated after an abnormality occurs in this individual output unit, calibrating output start times and output periods of the output units such that the output start times of the output units are identical and the output periods of the output units are identical;

a synchronous processing control unit, configured for controlling the output units to receive to-be-processed data based on the identical output start times, and further configured for, after the to-be-processed data is received, controlling the output units to complete the processing of the received to-be-processed data within a current output period, such that the output units output the processed data synchronously in a next output period.

In combination with the second aspect, in a first implementation of the second aspect, the synchronous output calibration unit includes:

a first configuration module, configured for broadcasting and configuring configuration parameters of the output units, such that the output periods of the output units are identical; and a first activation module, configured for broadcasting an activation signal to the output units, and controlling the output units to simultaneously activate an output time sequence, such that the output start times of the output units is the identical.

In combination with the first implementation of the second aspect, in a second implementation of the second aspect, the first configuration module includes:

a triggering submodule, configured for triggering the broadcasting of the configuration parameters of the output units by automatic detection or by receiving a calibration instruction input by a user manually;

a reset submodule, configured for controlling the configuration parameters of the output units to be reset; and a configuration submodule, configured for controlling the output units to simultaneously configure the broadcasted configuration parameters.

In combination with the second aspect, in a third implementation of the second aspect, the synchronous output calibration unit includes:

a grouping module, configured for determining, according to a synchronous output group identifier to which each of the output units belongs, a synchronous output group to which each of the output units belongs;

a second configuration module, configured for broadcasting and configuring configuration parameters of output units in each of different synchronous output groups, such that output periods of the output units in this synchronous output group are identical;

a second activation module, configured for broadcasting an activation signal to the output units in each of different synchronous output groups, and controlling the output units in this synchronous output group to simultaneously activate an output time sequence, such that the output start times of the output units in this synchronous output group are identical.

In combination with the third implementation of the second aspect, in a fourth implementation of the second aspect, the synchronous processing control unit includes:

a synchronous transmission module, configured for controlling the output units in each of the synchronous output groups to simultaneously generate an output interruption based on the identical output start times; and a synchronous receiving module, configured for, when the output units in each of the synchronous output groups simultaneously generate the output interruption, synchronously triggering the output units in the synchronous output group to simultaneously receive respective to-be-processed data.

In combination with the fourth implementation of the second aspect, in a fifth possible implementation of the second aspect, the to-be-processed data is video frame divided blocks;

the synchronous transmission module is configured for transmitting the video frame divided blocks, and transmitting control information corresponding to the video frame divided blocks in broadcast manner, and further configured for controlling the output units in each of the synchronous output groups to simultaneously generate an output interruption based on the identical output start times; and the synchronous receiving module is configured for, when the output units in each of the synchronous output groups simultaneously generate the output interruption, synchronously triggering the output units in the synchronous output group to simultaneously acquire respective video frame divided blocks and control information corresponding to the video frame divided blocks.

In combination with the third implementation of the second aspect, in a sixth possible implementation of the second aspect, the synchronous processing control unit is further configured for controlling the output units in each of the synchronous output groups to complete the processing of the received to-be-processed data within a current output period, such that the output units in the synchronous output group output the processed data synchronously in a next output period.

In combination with the sixth implementation of the second aspect, in a seventh implementation of the second aspect, the synchronous processing control unit includes:

a first output module, configured for, if the output units in the synchronous output group simultaneously receive respective to-be-processed data, completing, by the output units in the synchronous output group, the processing of the respective to-be-processed data before the output units in the synchronous output group simultaneously generate a next output interruption, so as to trigger the output units in the synchronous output group to synchronously output data which has been processed completely in a previous period when the output units in the synchronous output group simultaneously generate the next output interruption;

wherein, when the output units in the synchronous output group simultaneously generate an output interruption, the output units in the synchronous output group start a new output period.

In combination with the seventh implementation of the second aspect, in an eighth implementation of the second aspect, the to-be-processed data includes a video frame, an audio frame, or a control data set;

the synchronous processing control unit further includes:

a second output module, configured for, in case the to-be-processed data is a video frame or an audio frame, if the output units in the synchronous output group do not simultaneously receive respective video frames or audio frames, outputting previously outputted video frames or audio frames synchronously when the output units in the synchronous output group simultaneously generate the next output interruption; and a third output module, configured for, in case the to-be-processed data is control data, if the output units in the synchronous output group do not simultaneously receive respective control data, outputting preset invalid control data or outputting no control data when the output units in the synchronous output group simultaneously generate the next output interruption.

In combination with the eighth implementation of the second aspect, in a ninth implementation of the second aspect, the to-be-processed data is video frame divided blocks;

the first output module is configured for, if the output units in the synchronous output group simultaneously acquire respective video frame divided blocks and control information corresponding to the video frame divided blocks, completing, by the output units in the synchronous output group, the processing of the respective video frame divided blocks before the output units in the synchronous output group simultaneously generate a next output interruption, so as to trigger the output units in the synchronous output group synchronously output video frame divided blocks which have been processed completely in a previous output period when the output units in the synchronous output group simultaneously generate the next output interruption; and the second output module is configured for, if the output units in the synchronous output group do not simultaneously acquire respective video frame divided blocks and control information corresponding to the video frame divided blocks, synchronously outputting the previously outputted video frame divided blocks when the output units in the synchronous output group simultaneously generate the next output interruption;

wherein, when the output units in the synchronous output group simultaneously generate an output interruption, the output units in the synchronous output group start a new output period.

In combination with the third implementation of the second aspect, in a tenth implementation of the second aspect, the apparatus further includes:

a reference clock managing unit, configured for controlling reference clocks of the output units in each of the synchronous output groups when the output units in the synchronous output group are operating, such that the reference clocks of the output units in the synchronous output group are identical in phase and frequency.

In a third aspect, an embodiment of the present application provides an electronic device, including: a housing, a processor, a memory, a circuit board, and a power supply circuit, wherein the circuit board is disposed inside a space enclosed by the housing; the processor and the memory are disposed on the circuit board; the power supply circuit is used for supplying power for various circuits or components of the electronic device; the memory is used for storing executable program codes; and the processor performs the method for controlling a synchronous output of a digital matrix according to the embodiments of the present application by executing executable program codes stored in the memory.

In a fourth aspect, an embodiment of the present application provides executable program codes which, when executed, perform the method for controlling a synchronous output of a digital matrix according to the embodiments of the present application.

In a fifth aspect, an embodiment of the present application provides a storage medium for storing executable program codes, wherein the executable program codes, when executed, perform the method for controlling a synchronous output of a digital matrix according to the embodiments of the present application.

Embodiments of the present application provide a method and apparatus for controlling a synchronous output of a digital matrix, and an electronic device. When output units are activated or an individual output unit in the output units is re-activated after an abnormality occurs in this individual output unit, the synchronous output calibration unit calibrates output start times and output periods of the output units such that the output start times of the output units are identical and the output periods of the output units are identical. The synchronous processing control unit controls the output units to receive to-be-processed data based on the identical output start times; and after the to-be-processed data is received, controls the output units to complete the processing of the received to-be-processed data within a current output period, such that the output units output the processed data synchronously in a next output period. In this way, the synchronous outputs of the output units are achieved. In this way, even if the output start time and the output period of an individual output unit cannot be calibrated, only the output of this output unit is not in synchronization with other output units, which does not affect the synchronization of the outputs of other output units. Therefore, the problem that the displayed contents of all of the video output units are not synchronized when an existing synchronous processing control unit fails to normally receive a synchronization request signal sent by an individual video output unit, can be solved.

BRIEF DESCRIPTION OF THE DRAWINGS

In order to more clearly describe the technical solutions of the embodiments of the present application or of the prior art, drawings that need to be used in embodiments and the prior art will be briefly described below. Obviously, the drawings provided below are for only some embodiments of the present application; those skilled in the art can also obtain other drawings based on these drawings without any creative efforts.

DETAILED DESCRIPTION OF THE INVENTION

The embodiments of the present application will be described below in details with reference to the appended drawings.

It should be noted that the described embodiments are only some, and not all, of the embodiments of the present application. All other embodiments obtained based on the embodiments of the present application by those skilled in the art without any creative efforts fall into the scope of protection defined by the present application.

In an implementation, a method for controlling a synchronous output of a digital matrix according to an embodiment of the present application is applicable to any electronic device, for example, a large screen controller, a video integrated platform, and the like.

Figure 1:
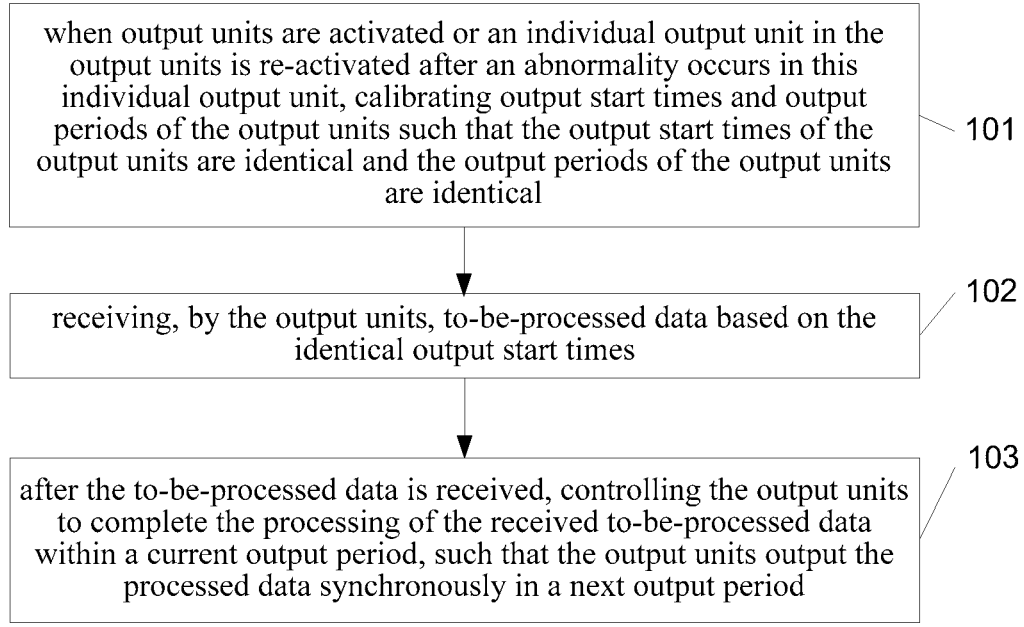
FIG. 1 is a schematic flow chart of a method for controlling a synchronous output of a digital matrix according to Embodiment 1 of the present application.

FIG. 1 is a schematic diagram of a method for controlling a synchronous output of a digital matrix according to an embodiment of the present application. As shown in FIG. 1, the method in this embodiment may include the following steps 101-103.

Step 101, when output units are activated or an individual output unit in the output units is reactivated after an abnormality occurs in the individual output unit, calibrating output start times and output periods of the output units such that the output start times of the output units are identical and the output periods of the output units are identical.

In this embodiment, when the output units are activated or an individual output unit in the output units is re-activated after an abnormality occurs in the individual output unit, for example, the output start times and the output periods of the output units may be calibrated by an synchronous output calibration unit, such that the output start times of the output units are identical and the output periods of the output units are identical. This may include specific steps H11 and H12.

At step H11, the synchronous output calibration unit is manually triggered to broadcast configuration parameters of the output units or the synchronous output calibration unit is triggered through automatic detection to broadcast configuration parameters of the output units; the configuration parameters of the output units are controlled to be reset, such that the configuration parameters of the output units are restored to default values; and the broadcasted configuration parameters are reconfigured for the output units, such that the output periods of the output units are identical. The configuration parameter is an output parameter related to the output period, and the configuration parameter is determined according to actual application circumstances. In this way, the synchronous output calibration unit can not only automatically calibrate the output periods of the output units, but also immediately calibrate, by receiving a calibration instruction manually input by a user, the output periods of the output units.

The immediate calibrating of, by receiving a calibration instruction manually input by a user, the output periods of the output units means that the synchronous output calibration unit is manually triggered to broadcast the configuration parameters of the output units. Specifically, the calibration instruction for instructing the broadcast of the configuration parameters of the output units is manually triggered, and the synchronous output calibration unit receives and responds to the calibration instruction to broadcast the configuration parameters of the output units. The synchronous output calibration unit is included in the above-mentioned electronic device.

At operation H12, the synchronous output calibration unit further broadcasts an activation signal to the output units, and controls the output units to simultaneously activate an output time sequence, such that the output start times of the output units are identical.

In this embodiment, for example, after an individual output unit in the output units is restarted or all of the output units are restarted after being powered off or after an abnormality occurs, the restarted output unit(s) is not calibrated, thus the restarted output unit(s) is not in synchronization with other un-restarted output units. At this point, the synchronous output calibration unit can calibrate all of the output units according to steps H11 and H12, so that the output start times of the output units are identical and the output periods of the output units are identical. As such, the output units, whose outputs are not synchronous, are synchronized again. In this way, the synchronization of the outputs of the output units can be realized. Thus, even if an individual output unit cannot normally receive the configuration parameter broadcasted by the synchronous output calibration unit, only the output of the output unit is not synchronous with other output units, which does not affect the synchronization of the outputs of the other output units.

In this embodiment, as an optional embodiment, calibrating output start times and output periods of the output units such that the output start times of the output units are identical and the output periods of the output units are identical includes:

broadcasting and configuring configuration parameters of the output units, so that the output periods of the output units are identical; and broadcasting an activation signal to the output units, and controlling the output units to simultaneously activate an output time sequence, so that the output start times of the output units are identical.

In this embodiment, as an optional embodiment, the broadcasting and configuring configuration parameters of the output units, so that the output periods of the output units are identical includes:

triggering the broadcasting of the configuration parameters of the output units by automatic detection, or by receiving a calibration instruction input manually by a user;

controlling the configuration parameters of the output units to be reset;

controlling the output units to simultaneously configure the broadcasted configuration parameters.

The output units are controlled to simultaneously configure the broadcasted configuration parameters, such that the output periods of the output units are identical.

Step 102, receiving, by the output units, to-be-processed data based on the identical output start times.

In a case, the electronic device may control the output units to receive the to-be-processed data based on the identical output start times.

Step 103, after the to-be-processed data is received, controlling the output units to complete the processing of the received to-be-processed data within a current output period, such that the output units synchronously output the processed data in a next output period.

In this embodiment, the to-be-processed data includes, but is not limited to, a video frame, an audio frame, or a control data set. In actual applications, the to-be-processed data includes various data that is output periodically and needs to be synchronously outputted or synchronously processed. Thus, the method for controlling a synchronous output of a digital matrix according to the embodiment is more widely applied.

In this embodiment, when the to-be-processed data is a video frame, the output unit is a video output unit. When the to-be-processed data is an audio frame, the output unit is an audio output unit. When the to-be-processed data is a control data set, the output unit is a control data output unit.

In this embodiment, the processing of the to-be-processed data received by the output units is controlled to be completed in the current output period. The processing here is related to the actual application. For example, when an output unit is to output a video, the processing may include: the scaling of the resolution of a video frame/divided blocks of a video frame, the converting of video format, the stacking of respective video frames/divided blocks of a video frame of a same output unit, the superposing of output Logo, the matching of the frame rates of a video input unit and a video output unit.

In this embodiment, the output period is generally inversely proportional to the output frame rate. When the output frame rate of video is 60 frames/second, the output period of video is 1/60 second.

In this embodiment, when the output units are operating, reference clocks of the output units may be controlled such that the reference clocks of the output units are identical in phase and frequency. In this way, the problem of frequency offset between the output units in a synchronous output group due to the operation of the system for a long time is avoided.

In the method for controlling a synchronous output of a digital matrix according to the embodiments, output start times and output periods of the output units are calibrated when the output units are activated or an individual output unit in the output units is re-activated after an abnormality occurs in the individual output, such that the output start times of the output units are identical and the output periods of the output units are identical; the output units receives to-be-processed data based on the identical output start times; the output units are controlled to complete the processing of the received to-be-processed data within a current output period after the output units receive the to-be-processed data, such that the output units output the processed data synchronously in a next output period. In this way, the synchronization of the outputs of the output units is achieved. In this way, even if the output start times and the output period of an individual output unit cannot be calibrated, only the output of this output unit is not in synchronization with other output units, which does not affect the synchronization of the outputs of other output units. Therefore, the problem that the displayed contents of all of the video output units are not synchronized when the existing synchronous processing control unit fails to normally receive a synchronization request signal sent by an individual video output unit, can be solved.

Figure 2:
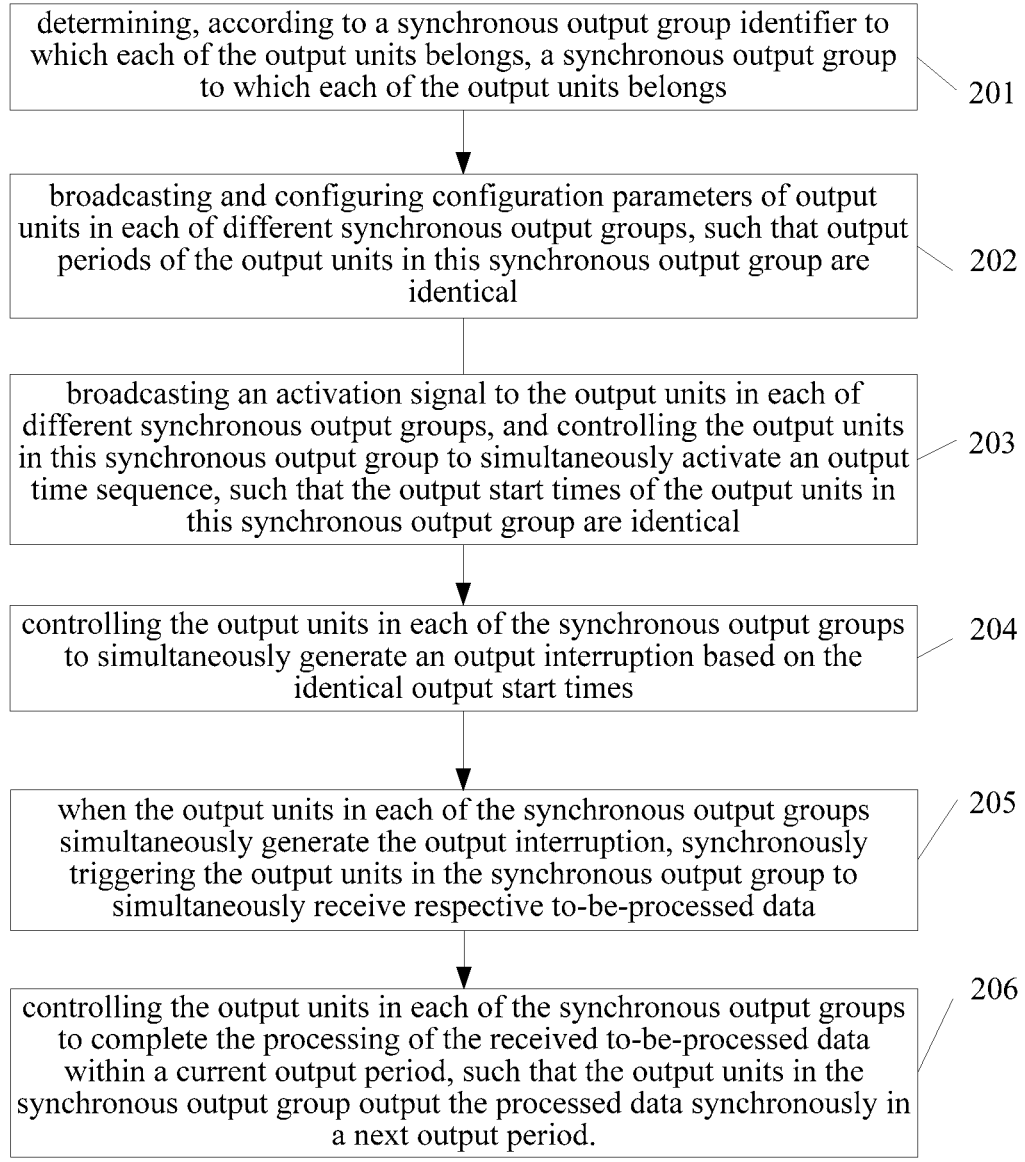
FIG. 2 is a schematic flow chart of a method for controlling a synchronous output of a digital matrix according to Embodiment 2 of the present application.

FIG. 2 is a flow chart of a method for controlling a synchronous output of a digital matrix according to Embodiment 2 of the present application. As shown in FIG. 2, the method in this embodiment may include steps 201-206.

Step 201, determining, according to a synchronous output group identifier to which each of the output units belongs, a synchronous output group to which each of the output units belongs.

In this embodiment, for example, the output unit is a video output unit. In Embodiment 1, since the synchronous processing control unit performs synchronous output/display control on all video output units, all video output units have the same output period for output. However, this method cannot achieve the synchronization of the outputs/displays of all video output units in each of multiple groups of video output units with different output periods. For example, the outputs of all video output units in video synchronous output group 1 are synchronized at 60 Hz, and the outputs of all video output units in video synchronous output group 2 are synchronized at 50 Hz. Therefore, in the present embodiment, the synchronous output group is introduced.

Figure 3:
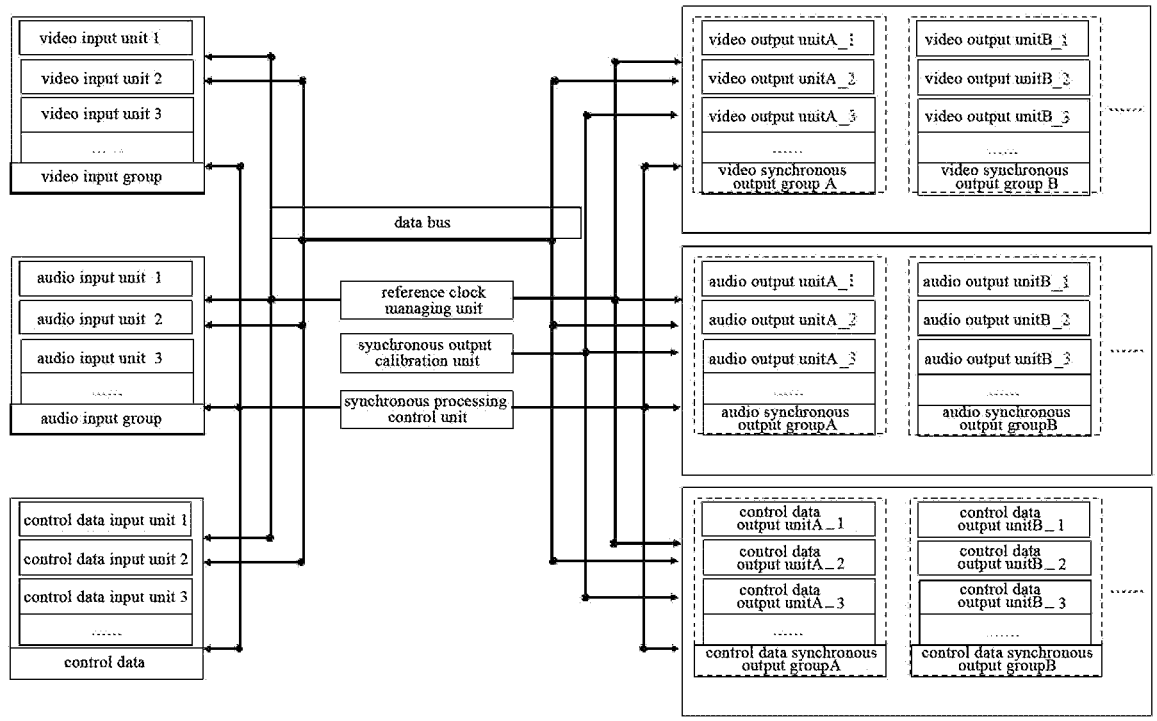
FIG. 3 is a schematic structural diagram of a digital matrix synchronous output system according to an embodiment of the present application.

In this embodiment, in a digital matrix, several output units are configured as one synchronous output group according to actual needs, and the outputs of all of the output units in the group are synchronous. As shown in FIG. 3, the video output units A-1, A-2 and A-3 are configured as video synchronous output group A, and video output units B-1, B-2 and B-3 are configured as video synchronous output group B. The video synchronous output group A and the video synchronous output group B are different. Audio output units A-1, A-2, A-3 are configured as audio synchronous output group A, and audio output units B-1, B-2, B-3 are configured as audio synchronous output group B. The audio synchronous output group A and the audio synchronous output group B are different. Control data output units A-1, A-2, A-3 are configured as control data synchronous output group A, and control data output units B-1, B-2, B-3 are configured as control data synchronous output group B. The control data synchronous output group A and the control data synchronous output group B are different. After all of the output units are grouped into different synchronous output groups, each output unit corresponds to one synchronous output group identifier. A synchronous output group to which each of the output units belongs can be determined according to a synchronous output group identifier to which this output unit belongs.

In this embodiment, not only a synchronous output group but also an input group is introduced. As shown in FIG. 3, video input units 1, 2, 3, . . . belong to an video input group; audio input units 1, 2, 3, . . . belong to an audio input group; and control data input units 1, 2, 3 . . . belong to a control data input group. This facilitates group management.

In this embodiment, the output data of each input unit can be outputted on each of output units of one or more different synchronous output groups. For an example, the data input by the video input unit 1 can be outputted/displayed synchronously in the video output units A-1, A-2, A-3 . . . in the video synchronous output group A, and at the same time can be outputted/displayed synchronously in the video output unit B-1, B-2, B-3 . . . in the video synchronous output group B. Since the video synchronous output group A and the video synchronous output group B are different video synchronous output groups, the video synchronous output group A and the video synchronous output group B can output/display the data input by the video input unit 1 synchronously in different output periods, respectively.

Step 202, broadcasting and configuring configuration parameters of output units in each of different synchronous output groups, such that output periods of the output units in this synchronous output group are identical.

In this embodiment, for example, the video synchronous output group A and the video synchronous output group B are different synchronous output groups in FIG. 3. The video synchronous output group A and the video synchronous output group B can be respectively broadcasted and configured through the synchronous output calibration unit, such that output periods of output units in the video synchronous output group A are identical and output periods of output units in the video synchronous output group B are identical.

Figure 4:
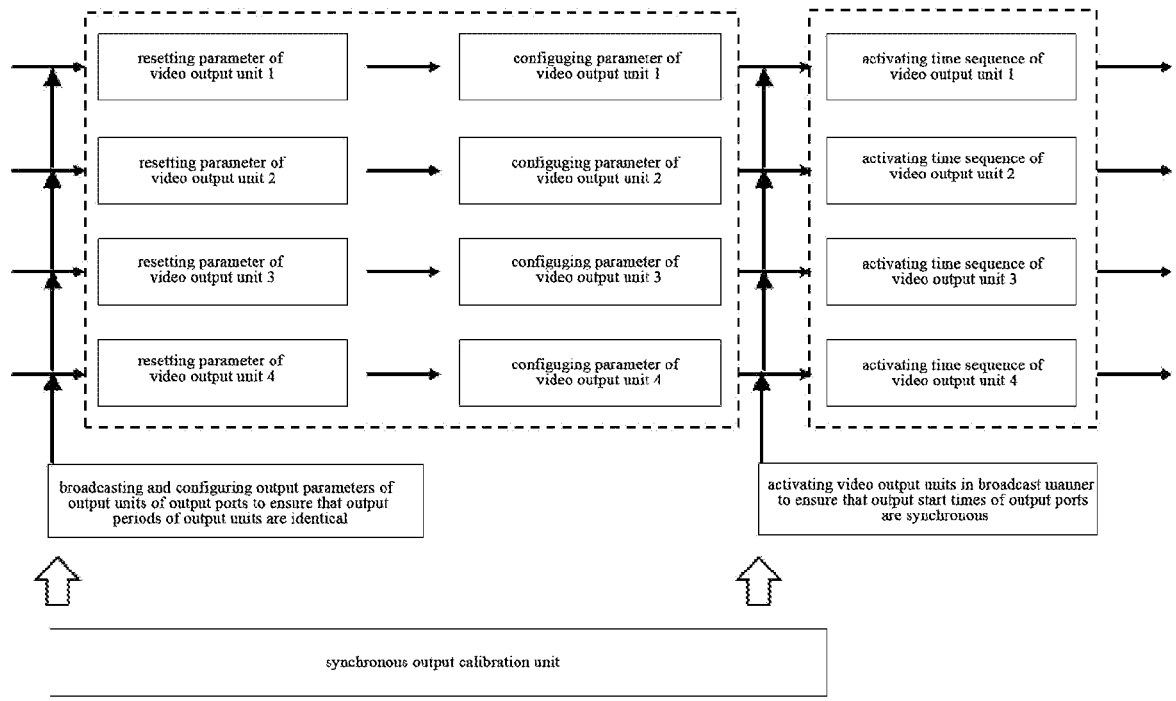
FIG. 4 is a schematic flow chart of calibrating a synchronous output group by a synchronous output calibration unit in FIG. 3.

In this embodiment, as shown in FIG. 4, it is assumed that the video synchronous output group A includes video output units 1, 2, 3 and 4. In broadcasting and configuring the video synchronous output group A by the synchronous output calibration unit, the synchronous output calibration unit is triggered manually to broadcast the configuration parameters of the video output units 1, 2, 3 and 4 in the video synchronous output group A, or the synchronous output calibration unit is triggered through automatic detection to broadcast the configuration parameters of the video output units 1, 2, 3 and 4 in the video synchronous output group A; controls the configuration parameters of the video output units 1, 2, 3 and 4 in the video synchronous output group A to be reset, such that the configuration parameters of the video output units 1, 2, 3 and 4 in the video synchronous output group A are restored to default values; and reconfigures the broadcasted configuration parameters for the video output units 1, 2, 3 and 4 in the video synchronous output group A, such that the configuration parameters of the video output units 1, 2, 3 and 4 in the video synchronous output group A are identical. In this way, it is ensured that the output periods of the video output units 1, 2, 3, and 4 in the video synchronous output group A are strictly identical, wherein the configuration parameter is a parameter related to the output period.

Step 203, broadcasting an activation signal to the output units in each of different synchronous output groups, and controlling the output units in this synchronous output group to simultaneously activate an output time sequence, such that the output start times of the output units in this synchronous output group are identical.

In this embodiment, for example, the video synchronous output group A and the video synchronous output group B in FIG. 3 are different synchronous output groups. The synchronous output calibration unit can broadcast an activation signal to the video synchronous output group A and the video synchronous output group B respectively, such that the output start times of the output units in the video synchronous output group A are identical, and the output start times of the output units in the video synchronous output group B are identical.

In this embodiment, as shown in FIG. 4, it is assumed that the video synchronous output group A includes video output units 1, 2, 3 and 4. In broadcasting the activation signal to the video synchronous output group A by the synchronous output calibration unit, the activation signal is broadcasted to the video output units 1, 2, 3 and 4 in the video synchronous output group A to control the video output units 1, 2, 3 and 4 in the video synchronous output group A to simultaneously activate output time sequences (that is, time sequence activation in FIG. 4), such that the output start times of the output units are identical.

In this embodiment, the calibrating of the output start times and the output periods of the audio output units in the audio synchronous output group by the synchronous output calibration unit, or the calibrating of the output start times and the output periods of the control data output units in the control data synchronous output group by the synchronous output calibration unit can refer to the solution shown in FIG. 4. In this way, the synchronous output calibration unit can be used to control the output start times of the video output units in the video synchronous output group to be identical and the output periods thereof to be identical, control the output start times of the audio output units in the audio synchronous output group to be identical and the output periods thereof to be identical, and control the output start times of the control data output units in the control data synchronous output group to be identical and the output periods thereof to be identical.

In this embodiment, the synchronous output calibration unit can not only automatically calibrate the output start times and output periods of the output units in the synchronous output group, but also receive a calibration instruction input by a user manually to calibrate the output start times and the output periods of the output units in the synchronous output group immediately.

In this embodiment, after an individual output unit or all of the output units in the synchronous output group are restarted after being powered off or after an abnormality therein occurs, the restarted output unit(s) is not calibrated, thus the restated output unit(s) is not in synchronization with other output units. At this time, the synchronous output calibration unit can calibrate all of the output units in the synchronous output group, so that the output start times of all of the output units are identical and the output periods thereof are identical. As such, the output units, whose outputs are not synchronous in the synchronous output group, are synchronized again. In this way, even if an individual output unit(s) in the synchronous output group cannot normally receive the configuration parameter broadcasted by the synchronous output calibration unit, only the output(s) of the output unit(s) is not in synchronization with other output units in the same synchronous output group, which does not affect the synchronization of the outputs of the other output units in the same synchronous output group.

Step 204, controlling the output units in the synchronous output group to simultaneously generate an output interruption based on the identical output start times.

In this embodiment, the synchronous processing control unit in the electronic device can control the output units in the synchronous output group to simultaneously generate an output interruption based on the identical output start times. In this way, the output units in the synchronous output group can simultaneously generate the output interruption every time, thereby ensuring that the output units in the synchronous output group receive the to-be-processed data synchronously and output the processed data synchronously.

Step 205, when the output units in each of the synchronous output groups simultaneously generate an output interruption, synchronously triggering the output units in the synchronous output group to simultaneously receive respective to-be-processed data.

Step 206, controlling the output units in each of the synchronous output groups to complete the processing of the received to-be-processed data within a current output period, such that the output units in the synchronous output group output the processed data synchronously in a next output period.

In this embodiment, the synchronous processing control unit may control the output units in each of the synchronous output groups to complete the processing of the received to-be-processed data in the current output period, such that the output units in the synchronous output group output the processed data synchronously in the next output period.

In this embodiment, in case the to-be-processed data is a video frame, the synchronous processing control unit controls video output units in a video synchronous output group to complete the processing of all video frame divided block data of a same video frame or same video frame data within the current output period, such that the video output units in the video synchronous output group output the processed data synchronously in the next output period. In this way, the outputs of video output units in a video synchronous output group are synchronous and the outputs of output units in each of different video synchronous output groups with different output periods are synchronous within respective output periods. For example, as shown in FIG. 3, the outputs of all video output units in the video synchronous output group A can be controlled to be synchronized at 60 Hz, and the outputs of all video output units in the video synchronous output group B can be controlled to be synchronized at 50 Hz. To better understand the video frame divided block, the video frame divided block is described as follows.

If a complete video frame image needs to be displayed across multiple splicing screens, a portion of the video frame, which is displayed on each splicing screen, is referred to as a video frame divided block. When the to-be-processed data is a video frame, the video frame may be a complete video frame or video frame divided blocks of the same video frame. For example, when a video frame is synchronously outputted on multiple video output units, each of the video output units needs to output the complete content of the video frame; when a video frame is spliced and outputted on multiple video output units, each of the video output units needs to output a video frame divided block of the current video frame.

In case the to-be-processed data is an audio frame, the synchronous processing control unit controls the audio output units in the audio synchronous output group to complete the processing of the same audio frame data within the current output period, such that the audio output units in the audio synchronous output group outputs the processed data in the next output period synchronously. In this way, the outputs of audio output units in an audio synchronous output group are synchronous, and the outputs of audio output units in each of different audio synchronous output groups with different output periods are synchronous within respective output periods.

In case the to-be-processed data is a control data set, the synchronous processing control unit controls the control data output units in the control data synchronous output group to complete the processing of the same control data set in the current output period, such that the control data output units in the control data synchronous output group output the processed data in the next output period synchronously. In this way, the outputs of control data output units in a control data synchronous output group are synchronous, and the outputs of control data output units in each of different control data synchronous output groups with different output periods are synchronous within respective output periods.

In this embodiment, the synchronous processing control unit is mainly used to control the output units in the synchronous output group to simultaneously complete the processing of the received to-be-processed data (for example, the video frame/audio frame/control data set) within the current output period, ensuring that the output units in the synchronous output group synchronously output the processed data in the next output period. In this way, the outputs of output units in the synchronous output group are synchronous, and the outputs of output units in each of different synchronous output groups with different output periods are synchronous within respective output periods and do not diverge as the system operates for a long time.

In this embodiment, as an optional embodiment, controlling the output units in the synchronous output group to complete the processing of the received to-be-processed data within a current output period, such that the output units in the synchronous output group output the processed data synchronously in a next output period, includes:

if the output units in the synchronous output group simultaneously receive respective to-be-processed data, completing the processing of the respective to-be-processed data before the output units in the synchronous output group simultaneously generate a next output interruption, so as to trigger the output units in the synchronous output group to synchronously output the data processed completedly within a previous period when the output units in the synchronous output group simultaneously generate the next output interruption;

wherein when the output units in the synchronous output group simultaneously generate an output interruption, the output units in the synchronous output group start a new output period.

In this embodiment, as an optional embodiment, the method further includes:

In case the to-be-processed data is a video frame or an audio frame, if the output units in the synchronous output group do not receive respective video frames or audio frames simultaneously, outputting previous output video frames or audio frames synchronously when the output units in the synchronous output group simultaneously generate the next output interruption; and in case the to-be-processed data is control data, if the output units in the synchronous output group do not receive respective control data simultaneously, outputting preset invalid control data or outputting no control data when the output units in the synchronous output group simultaneously generate the next output interruption.

Figure 5:
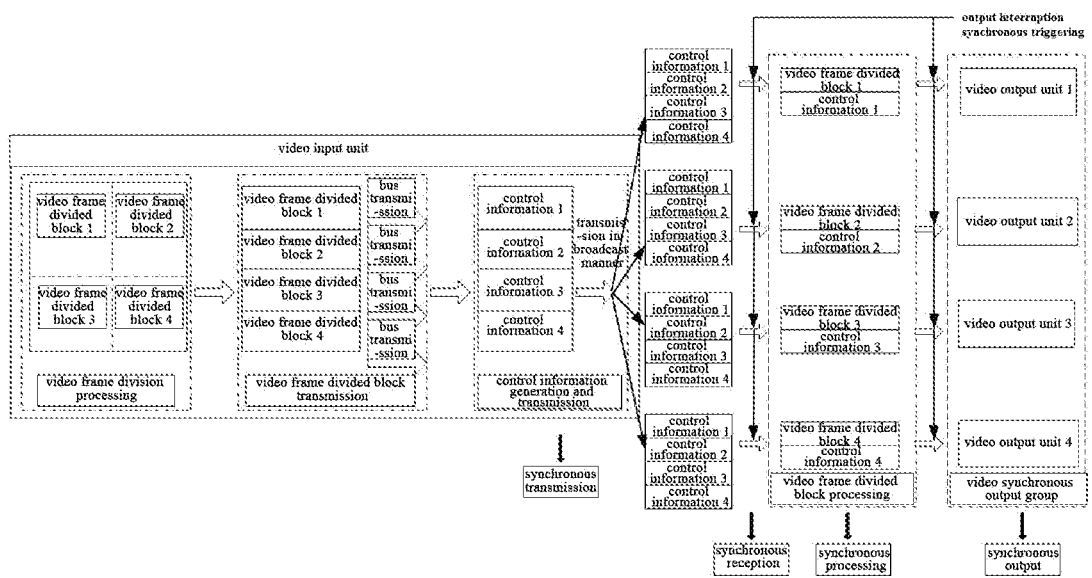
FIG. 5 is a schematic flow chart of controlling a video synchronous output group by a synchronous processing control unit in FIG. 3.

In this embodiment, the to-be-processed data is video frame divided blocks. As shown in FIG. 5, the video frame divided blocks are video frame divided blocks 1, 2, 3, and 4. Each video frame divided block corresponds to control information. The video frame divided block 1 corresponds to control information 1, the video frame divided block 2 corresponds to control information 2, the video frame divided block 3 corresponds to control information 3, and the video frame divided block 4 corresponds to control information 4.

In this embodiment, as shown in FIG. 5, in order to output the processed video frame divided blocks 1, 2, 3, and 4 by the video synchronous output group synchronously, the following specific operations A31-A34 are performed.

The operation A31 refers to synchronous transmission: video frame divided blocks 1, 2, 3 and 4 are transmitted through a bus, and control information 1, 2, 3 and 4 is transmitted in broadcast manner. Since the control information 1, 2, 3 and 4 is transmitted in broadcast manner, the video output units 1, 2, 3 and 4 in the video synchronous output group can receive the control information 1, 2, 3 and 4 simultaneously. The control information is additional information of the video frame, and each video frame divided block has corresponding control information. The control information may include, but is not limited to, attributes of a video frame divided block (for example, video frame resolution, scanning mode, storage mode, etc.) and the count of video frames. The function of the control information includes: describing basic information of a video frame/video frame divided block; ensuring that the video output units 1, 2, 3 and 4 in the video synchronous output group receive or do not receive control information simultaneously when the control information is transmitted in broadcast manner.

In this embodiment, whether the video output units 1, 2, 3, and 4 in the video synchronous output group acquire respective video frame divided blocks is based on whether they acquire the respective control information. The video frame divided block corresponding to the video output unit 1 is the video frame divided block 1, the video frame divided block corresponding to the video output unit 2 is the video frame divided block 2, the video frame divided block corresponding to the video output unit 3 is the video frame divided block 3, and the video frame divided block corresponding to the video output unit 4 is the video frame divided block 4. The control information corresponding to the video output unit 1 is the control information 1, the control information corresponding to the video output unit 2 is the control information 2, the control information corresponding to the video output unit 3 is the control information 3 and the control information corresponding to the video output unit 4 is control information 4.

The operation A32 refers to synchronous reception: the video output units 1, 2, 3 and 4 in the video synchronous output group generate an output interruption simultaneously, to synchronously trigger the video output units 1, 2, 3 and 4 in the video synchronous output group to simultaneously acquire respective video frame divided blocks and acquire respective control information from the received control information 1, 2, 3 and 4; at this time, the video output units 1, 2, 3, and 4 in the video synchronous output group simultaneously acquire or do not simultaneously acquire respective control information and video frame divided blocks. The two cases of simultaneously acquiring or not simultaneously acquiring respective control information and video frame divided blocks can both ensure that the video output units 1, 2, 3 and 4 in the video synchronous group synchronously output the video frame divided blocks (if the video output units 1, 2, 3 and 4 in the synchronous output group simultaneously acquire respective control information and video frame divided blocks, they complete the processing of the received video frame divided blocks in the current output period, and output respective processed video frame divided blocks in the next output period; if the video output units 1, 2, 3, and 4 in the video synchronous output group do not simultaneously acquire respective control information and video frame divided blocks, they perform no processing, and output the previously outputted video frame divided blocks in the next output period).

The operation A33 refers to synchronous processing, which will ensure that before the video output units 1, 2, 3 and 4 in the video synchronous output group generate a next output interruption to trigger the video output units 1, 2, 3 and 4 in the video synchronous output group to output corresponding video frame divided blocks, the video output units 1, 2, 3 and 4 complete the processing of the video frame divided blocks. During the synchronous processing, there is no need to ensure strict synchronization between the video output units 1, 2, 3, and 4 in the video synchronous output group.

The operation A34 refers to synchronous output: when the video output units 1, 2, 3 and 4 in the video synchronous output group generate the next output interruption to synchronously trigger the output of the video frames, the video output units 1, 2, 3 and 4 in the video synchronous output group are controlled to synchronously output the video frame divided blocks that are processed in synchronous processing of the previous output period, and corresponding control information (if the video output units 1, 2, 3 and 4 in the video synchronous output group do not receive the video frame divided blocks and corresponding control information in the previous output period, the video output units 1, 2, 3 and 4 in the video synchronous output group repeatedly output the latest video frame divided block data currently processed/the previously outputted video frame divided blocks).

In this embodiment, the method of controlling an audio synchronous output group or a control data synchronous output group by the synchronous processing control unit may refer to the flow chart shown in FIG. 5.

In this embodiment, as an optional embodiment, the to-be-processed data is video frame divided blocks.

The controlling the output units in the synchronous output group to complete the processing of the received to-be-processed data within a current output period, such that the output units in the synchronous output group output the processed data synchronously in a next output period includes:

if the output units in the synchronous output group simultaneously acquire respective video frame divided blocks and control information corresponding to the video frame divided blocks, completing, by the output units in the synchronous output group, the processing of the respective video frame divided blocks before simultaneously generating a next output interruption, so as to trigger the output units in the synchronous output group to synchronously output the video frame divided blocks that are processed completely in the previous output period when the output units in the synchronous output group simultaneously generate the next output interruption; and if the output units in the synchronous output group do not simultaneously acquire respective video frame divided blocks and control information corresponding to the video frame divided blocks, synchronously outputting, by the output units, the previously outputted video frame divided blocks when the output units in the synchronous output group simultaneously generate the next output interruption;

wherein when the output units in the synchronous output group simultaneously generate an output interruption, the output units in the synchronous output group start a new output period.

In the method for controlling a synchronous output of a digital matrix according to the embodiments, output start times and output periods of output units in each of different synchronous output group are identical by calibrating the output start times and the output periods of the output units in this synchronous output group; the output units in the synchronous output group are controlled to simultaneously generate an output interruption based on the identical output start times; when the output units in the synchronous output group simultaneously generate the output interruption, the output units in the synchronous output group are triggered synchronously to receive respective to-be-processed data simultaneously; the output units in the synchronous output group are controlled to complete the processing of the received to-be-processed data within a current output period, such that the output units in the synchronous output group output the processed data synchronously in a next output period. In this way, the outputs of output units in a synchronous output group are synchronous and the outputs of output units in each of different output groups with different output periods are synchronous in respective output periods. Even if an output start time and an output period of an individual output unit in a synchronous output group cannot be calibrated, only the output of this output unit is not in synchronization with other output units in the synchronous output group, which does not affect the synchronization of the outputs of other output units in the synchronous output group. Therefore, the problem that the displayed contents of all of the video output units are not synchronized when the existing synchronous processing control unit fails to normally receive a synchronization request signal sent by an individual video output unit, can be solved.

Figure 6:
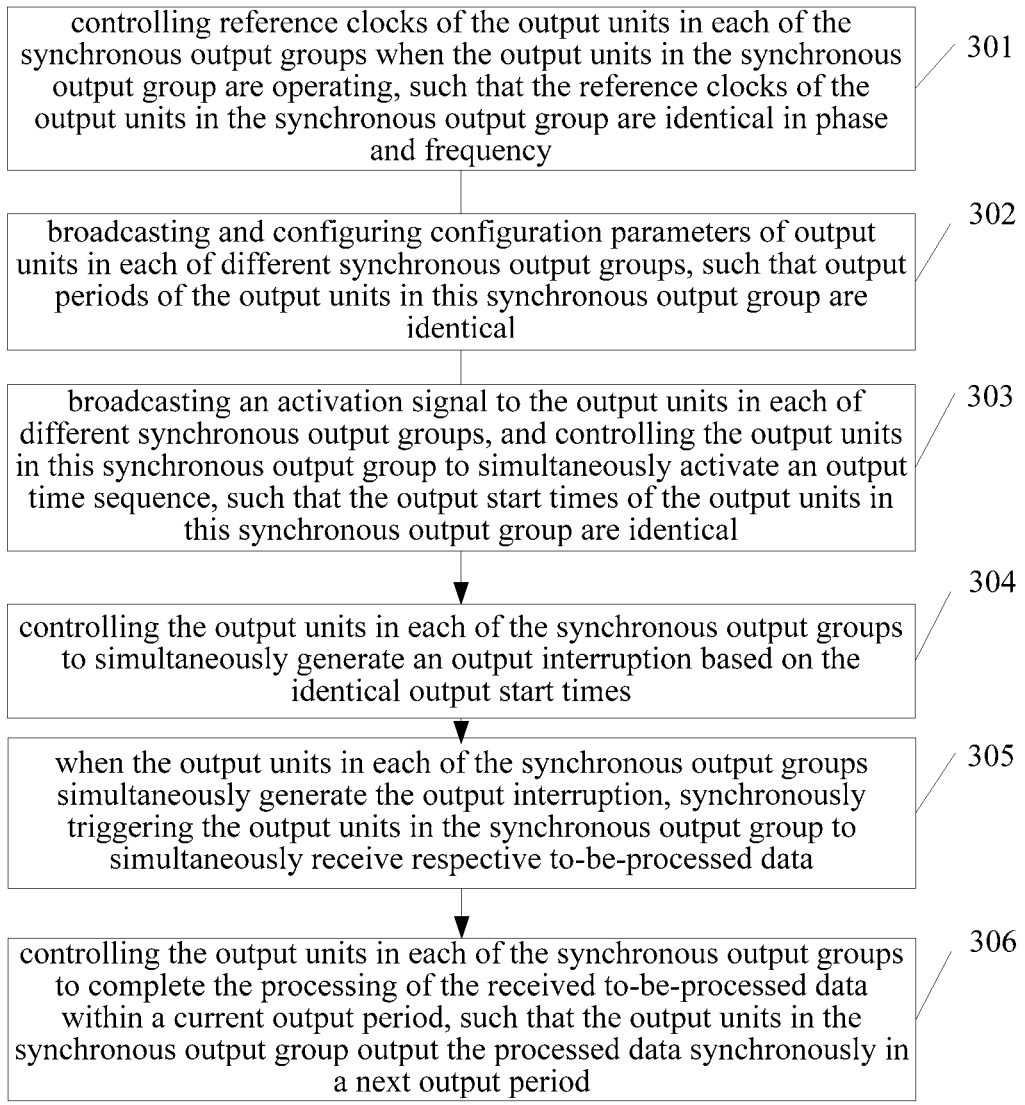
FIG. 6 is a schematic flow chart of a method for controlling a synchronous output of a digital matrix according to Embodiment 3 of the present application.

FIG. 6 is a flow chart of a method for controlling a synchronous output of a digital matrix according to Embodiment 2 of the present application. As shown in FIG. 6, the method may include steps 301-306.

Step 301, controlling reference clocks of output units in a synchronous output group when the output units in the synchronous output group are operating, such that the reference clocks of the output units in the synchronous output group are identical in phase and frequency.

In this embodiment, when the output units in the synchronous output group are operating, the synchronous output group is managed by a reference clock management unit to control the reference clocks of the output units in the synchronous output group, such that the reference clocks of the output units in the synchronous output group are identical in phase and frequency. For example, the reference clocks of the video output units in the video synchronous output group are identical in phase and frequency; the reference clocks of the audio output units in the audio synchronous output group are identical in phase and frequency, and the reference clocks of the control data output units in the control data synchronous output group are identical in phase and frequency.

In this embodiment, as shown in FIG. 3, the reference clock management unit can control the reference clocks of the output units in the synchronous output group, which can avoid the problem of possible frequency offset between the output units in the synchronous output group due to the operating of the system for a long time.

Step 302, broadcasting and configuring configuration parameters of output units in each of different synchronous output groups, such that output periods of the output units in this synchronous output group are identical.

In this embodiment, the step 302 is similar to the step 202 in the foregoing method embodiment, and the details are not repeated herein.

Step 303, broadcasting an activation signal to the output units in each of different synchronous output groups, and controlling the output units in this synchronous output group to simultaneously activate an output time sequence, such that the output start times of the output units in this synchronous output group are identical.

In this embodiment, the step 303 is similar to the step 203 in the foregoing method embodiment, and the details are not repeated herein.

Step 304, controlling the output units in the synchronous output group to simultaneously generate an output interruption based on the identical output start times.

In this embodiment, the step 304 is similar to the step 204 in the foregoing method embodiment, and the details are not repeated herein.

Step 305, when the output units in the synchronous output group simultaneously generate the output interruption, triggering synchronously the output units in the synchronous output group to simultaneously receive respective to-be-processed data.

In this embodiment, the step 305 is similar to the step 205 in the foregoing method embodiment, and the details are not repeated herein.

Step 306, controlling the output units in the synchronous output group to complete the processing of the received to-be-processed data within a current output period, such that the output units in the synchronous output group synchronously output the processed data in a next output period.

In this embodiment, the step 306 is similar to the step 206 in the foregoing method embodiment, and the details are not repeated herein.

In this embodiment, synchronous outputs of video output units in a video synchronous output group in a digital matrix, synchronous outputs of audio output units in the audio synchronous output group in a digital matrix and synchronous outputs of control data output units in the control data synchronous output group in a digital matrix, or more general synchronous output, synchronous control, and synchronous transmission, can be achieved by using the reference clock management unit, the synchronous output control unit, and the synchronous processing control unit.

In practical applications, as long as the reference clock management unit, the synchronous output control unit, and the synchronous processing control unit are involved, the technical solution described in the present invention can be implemented quickly and efficiently. Based on the same principle, as long as the reference clock management unit, the synchronous output control unit and the synchronous processing control unit are involved, the synchronous output of data such as video, audio, control data set or the like, or more generally, the synchronous output, synchronous play, synchronous control, synchronous transmission or the like can be realized by using the technical solutions described herein.

In the method for controlling a synchronous output of a digital matrix according to the embodiments, output start times and output periods of output units in each of different synchronous output group are identical by calibrating the output start times and the output periods of the output units in this synchronous output group; the output units in the synchronous output group are controlled to simultaneously generate an output interruption based on the identical output start times; when the output units in the synchronous output group simultaneously generate the output interruption, the output units in the synchronous output group are triggered synchronously to receive respective to-be-processed data simultaneously; the output units in the synchronous output group are controlled to complete the processing of the received to-be-processed data within a current output period, such that the output units in the synchronous output group output the processed data synchronously in a next output period. In this way, the outputs of output units in a synchronous output group are synchronous and the outputs of output units in each of different output groups with different output periods are synchronous in respective output periods. Even if an output start time and an output period of an individual output unit in a synchronous output group cannot be calibrated, only the output of this output unit is not in synchronization with other output units in the synchronous output group, which does not affect the synchronization of the outputs of other output units in the synchronous output group. Therefore, the problem that the displayed contents of all of the video output units are not synchronized when the existing synchronous processing control unit fails to normally receive a synchronization request signal sent by an individual video output unit, can be solved. Furthermore, reference clocks of output units in a synchronous output group are controlled when the output units in the synchronous output group are operating, such that the reference clocks of the output units in the synchronous output group are identical in phase and frequency, which can avoid the problem of possible frequency offset between the output units in the synchronous output group due to the operating of the system for a long time.

Figure 7:
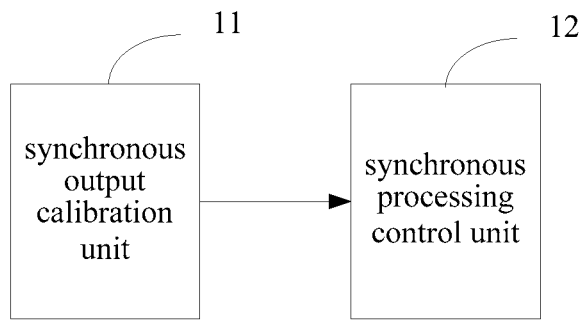
FIG. 7 is a schematic structural diagram of an apparatus for controlling a synchronous output of a digital matrix according to Embodiment 4 of the present application.

FIG. 7 is a schematic structural diagram of an apparatus for controlling a synchronous output of a digital matrix according to Embodiment 1 of the present application. As shown in FIG. 7, the apparatus in the embodiment may include a synchronous output calibration unit 11 and a synchronous processing control unit 12.

The synchronous output calibration unit 11 is configured for, when output units are activated or an individual output unit in the output units is re-activated after an abnormality occurs in this individual output unit, calibrating output start times and output periods of the output units such that the output start times of the output units are identical and the output periods of the output units are identical.

In this embodiment, when the output units are activated or an individual output unit in the output units is re-activated after an abnormality occurs in the individual output unit, for example, the output start times and the output periods of the output units may be calibrated by the synchronous output calibration unit, such that the output start times of the output units are identical and the output periods of the output units are identical. This may include specific steps H11 and H12.

At step H11, the synchronous output calibration unit is manually triggered to broadcast configuration parameters of the output units or the synchronous output calibration unit is triggered through automatic detection to broadcast configuration parameters of the output units; the configuration parameters of the output units are controlled to be reset, such that the configuration parameters of the output units are restored to default values; and the broadcasted configuration parameters are reconfigured for the output units, such that the output periods of the output units are identical. The configuration parameter is an output parameter related to the output period, and the configuration parameter is determined according to actual application circumstances. In this way, the synchronous output calibration unit can not only automatically calibrate the output periods of the output units, but also immediately calibrate, by receiving a calibration instruction manually input by a user, the output periods of the output units.

The immediate calibrating of, by receiving a calibration instruction manually input by a user, the output periods of the output units means that the synchronous output calibration unit is manually triggered to broadcast the configuration parameters of the output units. Specifically, the calibration instruction for instructing the broadcast of the configuration parameters of the output units is manually triggered, and the synchronous output calibration unit receives and responds to the calibration instruction to broadcast the configuration parameters of the output units.

At operation H12, the synchronous output calibration unit further broadcasts an activation signal to the output units, and controls the output units to simultaneously activate an output time sequence, such that the output start times of the output units are identical.

In this embodiment, for example, after an individual output unit in the output units is restarted or all of the output units are restarted after being powered off or after an abnormality occurs, the restarted output unit(s) is not calibrated, thus the restarted output unit(s) is not in synchronization with other un-restarted output units. At this point, the synchronous output calibration unit can calibrate all of the output units according to steps H11 and H12, so that the output start times of the output units are identical and the output periods of the output units are identical. As such, the output units, whose outputs are not synchronous, are synchronized again. In this way, the synchronous outputs of the output units can be realized. Thus, even if an individual output unit cannot normally receive the configuration parameter broadcasted by the synchronous output calibration unit, only the output of the output unit is not synchronous with other output units, which does not affect the synchronization of the outputs of the other output units.

In this embodiment, as an optional embodiment, the synchronous output calibration unit 11 includes:

a first configuration module, configured for broadcasting and configuring configuration parameters of the output units, such that the output periods of the output units are identical; and a first activation module, configured for broadcasting an activation signal to the output units, and controlling the output units to simultaneously activate an output time sequence, such that the output start times of the output units are identical.

In this embodiment, as an optional embodiment, the first configuration module includes:

a triggering submodule, configured for triggering the broadcasting of the configuration parameters of the output units by automatic detection or by receiving a calibration instruction input by a user manually;

a reset submodule, configured for controlling the configuration parameters of the output units to be reset; and a configuration submodule, configured for controlling the output units to simultaneously configure the broadcasted configuration parameters.

The output units are controlled to simultaneously configure the broadcasted configuration parameters, such that the output periods of the output units are identical.

The synchronous processing control unit 12 is configured for controlling the output units to receive to-be-processed data based on the identical output start times, and further configured for, after the to-be-processed data is received, controlling the output units to complete the processing of the received to-be-processed data within a current output period, such that the output units output the processed data synchronously in a next output period.

In this embodiment, when the output units are operating, reference clocks of the output units may be controlled such that the reference clocks of the output units are identical in phase and frequency. In this way, the problem of frequency offset between the output units in a synchronous output group due to the operation of the system for a long time is avoided.

In the apparatus for controlling a synchronous output of a digital matrix according to the embodiments, when output units are activated or an individual output unit in the output units is re-activated after an abnormality occurs in this individual output unit, the synchronous output calibration unit calibrates output start times and output periods of the output units such that the output start times of the output units are identical and the output periods of the output units are identical; the synchronous processing control unit controls the output units to receive to-be-processed data based on the identical output start times; and after the to-be-processed data is received, controls the output units to complete the processing of the received to-be-processed data within a current output period, such that the output units output the processed data synchronously in a next output period. In this way, the synchronous outputs of the output units are achieved. Even if the output start time and the output period of an individual output unit cannot be calibrated, only the output of this output unit is not in synchronization with other output units, which does not affect the synchronization of the outputs of other output units. Therefore, the problem that the displayed contents of all of the video output units are not synchronized when an existing synchronous processing control unit fails to normally receive a synchronization request signal sent by an individual video output unit, can be solved.

Figure 8:
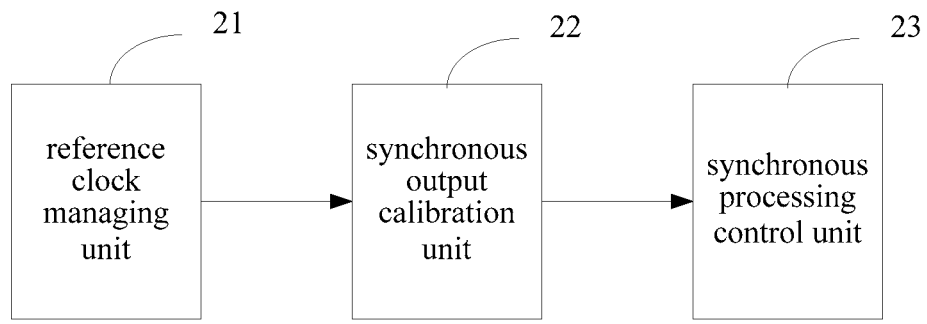
FIG. 8 is a schematic structural diagram of an apparatus for controlling a synchronous output of a digital matrix according to Embodiment 5 of the present application.

FIG. 8 is a schematic structural diagram of an apparatus for controlling a synchronous output of a digital matrix according Embodiment 2 of the present application. As shown in FIG. 8, the apparatus in the embodiment may include a reference clock managing unit 21, a synchronous output calibration unit 22 and a synchronous processing control unit 23.

The reference clock managing unit 21 is configured for controlling reference clocks of the output units in each of the synchronous output groups when the output units in the synchronous output group are operating, such that the reference clocks of the output units in the synchronous output group are identical in phase and frequency.

In this embodiment, when the output units in the synchronous output group are operating, the synchronous output group is managed by the reference clock management unit 21 to control the reference clocks of the output units in the synchronous output group, such that the reference clocks of the output units in the synchronous output group are identical in phase and frequency. For example, the reference clocks of the video output units in the video synchronous output group are identical in phase and frequency; the reference clocks of the audio output units in the audio synchronous output group are identical in phase and frequency, and the reference clocks of the control data output units in the control data synchronous output group are identical in phase and frequency.

In this embodiment, the reference clock management unit can control the reference clocks of the output units in the synchronous output group, which can avoid the problem of possible frequency offset between the output units in the synchronous output group due to the operating of the system for a long time.

The synchronous output calibration unit 22 includes a grouping module, a second configuration module and a second activation module.

The grouping module is configured for determining, according to a synchronous output group identifier to which each of the output units belongs, a synchronous output group to which each of the output units belongs.

In this embodiment, in the digital matrix, several output units are configured as one synchronous output group through the grouping module according to actual needs. The outputs of output units in the group are synchronous. After all of the output units are divided into different synchronous output groups, each of the output units corresponds to a synchronous output group identifier. According to the synchronous output group identifier to which each of the output units belongs, the synchronous output group to which each of the output units belongs can be determined.

The second configuration module is configured for broadcasting and configuring configuration parameters of output units in each of different synchronous output groups, such that output periods of the output units in this synchronous output group are identical.

In this embodiment, the video synchronous output group A and the video synchronous output group B in FIG. 3 are different synchronous output groups. The video synchronous output group A and the video synchronous output group B can be respectively configured through the second configuration module in broadcast manner, such that the output periods of the output units in the video synchronous output group A are identical and the output periods of the output units in the video synchronous output group B are identical.

The second activation module is configured for broadcasting an activation signal to the output units in each of different synchronous output groups, and controlling the output units in this synchronous output group to simultaneously activate an output time sequence, such that the output start times of the output units in this synchronous output group are identical.

In this embodiment, the video synchronous output group A and the video synchronous output group B in FIG. 3 are different synchronous output groups. The second activation module can broadcast an activation signal to the video synchronous output group A and the video synchronous output group B respectively, such that the output start times of the output units in the video synchronous output group A are identical and the output start times of the output units in the video synchronous output group B are identical.

The synchronous processing control unit 23 includes a synchronous transmission module and a synchronous receiving module.

The synchronous transmission module is configured for controlling the output units in each of the synchronous output groups to simultaneously generate an output interruption based on the identical output start times.

In this embodiment, the output units in the synchronous output group simultaneously generate an output interruption based on the identical output start times. In this way, the output units in the synchronous output group can simultaneously generate the output interruption every time, thereby ensuring that the output units in the synchronous output group receive the to-be-processed data synchronously and output the processed data synchronously.

The synchronous receiving module is configured for, when the output units in each of the synchronous output groups simultaneously generate the output interruption, synchronously triggering the output units in the synchronous output group to simultaneously receive respective to-be-processed data.

In this embodiment, as an optional embodiment, the to-be-processed data is video frame divided blocks. The synchronous transmission module is configured for transmitting the video frame divided blocks, and transmitting control information corresponding to the video frame divided blocks in broadcast manner, and further configured for controlling the output units in each of the synchronous output groups to simultaneously generate an output interruption based on the identical output start times.

The synchronous receiving module is configured for, when the output units in each of the synchronous output groups simultaneously generate the output interruption, synchronously triggering the output units in the synchronous output group to simultaneously acquire respective video frame divided blocks and control information corresponding to the video frame divided blocks.

The synchronous processing control unit 23 is further configured for controlling the output units in each of the synchronous output groups to complete the processing of the received to-be-processed data within a current output period, such that the output units in the synchronous output group output the processed data synchronously in a next output period.

In this embodiment, in case the to-be-processed data is a video frame, the synchronous processing control unit controls video output units in a video synchronous output group to complete the processing of all video frame divided block data of a same video frame or same video frame data within the current output period, such that the video output units in the video synchronous output group output the processed data synchronously in the next output period. In this way, the outputs of video output units in a video synchronous output group are synchronous and the outputs of output units in each of different video synchronous output groups with different output periods are synchronous within respective output periods. For example, as shown in FIG. 3, the outputs of all video output units in the video synchronous output group A can be controlled to be synchronized at 60 Hz, and the outputs of all video output units in the video synchronous output group B can be controlled to be synchronized at 50 Hz. To better understand the video frame divided block, the video frame divided block is described as follows.

If a complete video frame image needs to be displayed across multiple splicing screens, a portion of the video frame, which is displayed on each splicing screen, is referred to as a video frame divided block. When the to-be-processed data is a video frame, the video frame may be a complete video frame or video frame divided blocks of the same video frame. For example, when a video frame is synchronously outputted on multiple video output units, each of the video output units needs to output the complete content of the video frame; when a video frame is spliced and outputted on multiple video output units, each of the video output units needs to output a video frame divided block of the current video frame.

In case the to-be-processed data is an audio frame, the synchronous processing control unit controls the audio output units in the audio synchronous output group to complete the processing of the same audio frame data within the current output period, such that the audio output units in the audio synchronous output group outputs the processed data in the next output period synchronously. In this way, the outputs of audio output units in an audio synchronous output group are synchronous, and the outputs of audio output units in each of different audio synchronous output groups with different output periods are synchronous within respective output periods.

In case the to-be-processed data is a control data set, the synchronous processing control unit controls the control data output units in the control data synchronous output group to complete the processing of the same control data set in the current output period, such that the control data output units in the control data synchronous output group output the processed data in a next output period synchronously. In this way, the outputs of control data output units in a control data synchronous output group are synchronous, and the outputs of control data output units in each of different control data synchronous output groups with different output periods are synchronous within respective output periods.

In this embodiment, the synchronous processing control unit is mainly used to control the output units in the synchronous output group to simultaneously complete the processing of the received to-be-processed data (for example, the video frame/audio frame/control data set) within the current output period, ensuring that the output units in the synchronous output group synchronously output the processed data in the next output period. In this way, the outputs of output units in the synchronous output group are synchronous, and the outputs of output units in each of different synchronous output groups with different output periods are synchronous within respective output periods and do not diverge as the system operates for a long time.

In the embodiment, as an optional embodiment, the synchronous processing control unit 23 includes a first output module.

The first output module is configured for, if the output units in the synchronous output group simultaneously receive respective to-be-processed data, completing, by the output units in the synchronous output group, the processing of the respective to-be-processed data before the output units in the synchronous output group simultaneously generate a next output interruption, so as to trigger the output units in the synchronous output group to synchronously output data which has been processed completely in a previous period when the output units in the synchronous output group simultaneously generate the next output interruption.

When the output units in the synchronous output group simultaneously generate an output interruption, the output units in the synchronous output group start a new output period.

In this embodiment, as an optional embodiment, the to-be-processed data includes a video frame, an audio frame, or a control data set.

The synchronous processing control unit 23 further includes:

a second output module, configured for, in case the to-be-processed data is a video frame or an audio frame, if the output units in the synchronous output group do not simultaneously receive respective video frames or audio frames, outputting previously outputted video frames or audio frames synchronously when the output units in the synchronous output group simultaneously generate the next output interruption; and a third output module, configured for, in case the to-be-processed data is control data, if the output units in the synchronous output group do not simultaneously receive respective control data, outputting preset invalid control data or outputting no control data when the output units in the synchronous output group simultaneously generate the next output interruption.

In this embodiment, as an optional embodiment, the to-be-processed data is video frame divided blocks.

The first output module is configured for, if the output units in the synchronous output group simultaneously acquire respective video frame divided blocks and control information corresponding to the video frame divided blocks, completing, by the output units in the synchronous output group, the processing of the respective video frame divided blocks before the output units in the synchronous output group simultaneously generate a next output interruption, so as to trigger the output units in the synchronous output group synchronously output video frame divided blocks which have been processed completely in a previous output period when the output units in the synchronous output group simultaneously generate the next output interruption.

The second output module is configured for, if the output units in the synchronous output group do not simultaneously acquire respective video frame divided blocks and control information corresponding to the video frame divided blocks, synchronously outputting the previously outputted video frame divided blocks when the output units in the synchronous output group simultaneously generate the next output interruption.

When the output units in the synchronous output group simultaneously generate an output interruption, the output units in the synchronous output group start a new output period.

In the apparatus for controlling a synchronous output of a digital matrix according to the embodiments, the synchronous output calibration unit calibrates the output start times and the output periods of the output units in each of different synchronous output group, so that output start times and output periods of output units in this synchronous output group are identical; the synchronous processing control unit controls the output units in the synchronous output group to simultaneously generate an output interruption based on the identical output start times; when the output units in the synchronous output group simultaneously generate the output interruption, the synchronous processing control unit synchronously triggers the output units in the synchronous output group to receive respective to-be-processed data simultaneously; the synchronous processing control unit controls the output units in the synchronous output group to complete the processing of the received to-be-processed data within a current output period, such that the output units in the synchronous output group output the processed data synchronously in a next output period. In this way, the outputs of output units in a synchronous output group are synchronous and the outputs of output units in each of different output groups with different output periods are synchronous in respective output periods. Even if an output start time and an output period of an individual output unit in a synchronous output group cannot be calibrated, only the output of this output unit is not in synchronization with other output units in the synchronous output group, which does not affect the synchronization of the outputs of other output units in the synchronous output group. Therefore, the problem that the displayed contents of all of the video output units are not synchronized when the existing synchronous processing control unit fails to normally receive a synchronization request signal sent by an individual video output unit, can be solved. Furthermore, reference clocks of output units in a synchronous output group are controlled by the reference clock managing unit when the output units in the synchronous output group are operating, such that the reference clocks of the output units in the synchronous output group are identical in phase and frequency, which can avoid the problem of possible frequency offset between the output units in the synchronous output group due to the operating of the system for a long time.

It should be noted that the relationship terms use here, such as "first," "second," and the like are only used to distinguish one entity or operation from another entity or operation, but do not necessarily require or imply that there is actual relationship or order between these entities or operations. Moreover, the terms "include," "comprise," or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "comprise(s) a/an . . . " and "include(s) a/an . . . " do not exclude additional identical elements in the processes, methods, articles, or devices, including the listed elements.

All of the embodiments in the description are described in a correlated manner, and identical or similar parts in various embodiments can refer to one another. In addition, the description for each embodiment focuses on the differences from other embodiments.

In particular, the embodiment of the apparatus is described briefly, since it is substantially similar to the embodiment of the method, and the related contents can refer to the description of the embodiment of the method.

The logic and/or steps represented in the flow charts or otherwise described herein, for example, may be considered as a sequence list of executable instructions for implementing logical functions, and may be embodied in any computer readable medium for use by an instruction execution system, apparatus, or device (eg, a computer-based system, a system including a processor, or other system that can acquire and execute instructions from an instruction execution system, apparatus, or device), or in conjunction with the instruction execution system, apparatus, or device. For the purposes of this specification, a "computer readable medium" can be any apparatus that can contain, store, communicate, propagate, or transmit a program for use in an instruction execution system, apparatus, or device, or in conjunction with the instruction execution system, apparatus, or device. More specific examples (non-exhaustive list) of computer readable media include the following: electrical connections (electronic device) having one or more wires, portable computer disk cartridges (magnetic devices), random access memory (RAM), read only memory (ROM), erasable editable read only memory (EPROM or flash memory), fiber optic devices, and portable compact disk read only memory (CDROM). In addition, the computer readable medium may even be a paper or other suitable medium on which the program can be printed, since the paper or other medium can be optically scanned, for example, and then can be edited, interpreted or, if appropriate, processed by other suitable manners to obtain the program electronically and store it in a computer memory.

It should be understood that portions of the application may be implemented in hardware, software, firmware, or a combination thereof.

In the above described embodiments, multiple steps or methods may be implemented in software or firmware stored in a memory and executed by a suitable instruction execution system. For example, if multiple steps or methods are implemented in hardware, as in another implementation, they can be implemented by any one or combination of the well known techniques in the art: a discrete logic circuit having a logic gate for implementing a logic function on a data signal, a dedicated integrated circuit having suitable combinational logic gate, a programmable gate array (PGA), a field programmable gate array (FPGA), and so on.

Figure 9:
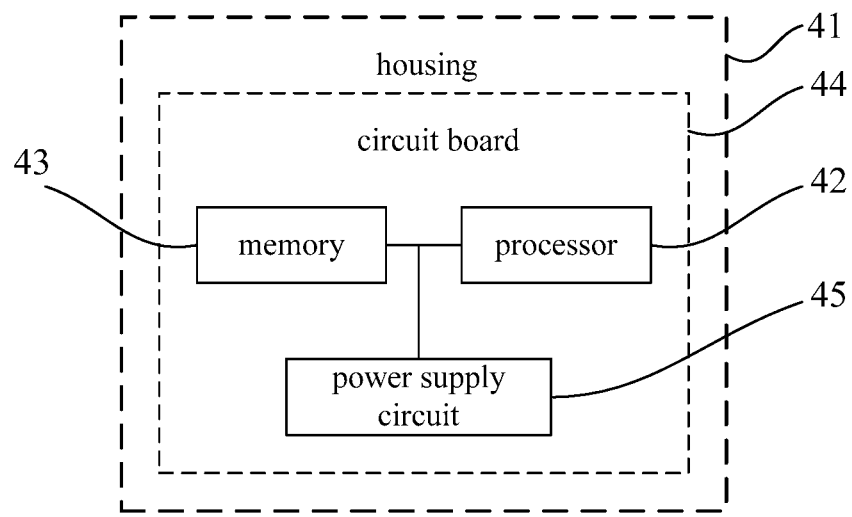
FIG. 9 is a schematic structural diagram of an electronic device according to an embodiment of the present application.

An embodiment of the present application further provides an electronic device. FIG. 9 is a schematic structural diagram of an electronic device according to an embodiment of the present application, which can implement the flow of the embodiments shown in FIGS. 1-8 of the present application. As shown in FIG. 9, the above electronic device may includes a housing 41, a processor 42, a memory 43, a circuit board 44, and a power supply circuit 45, wherein the circuit board 44 is disposed inside a space enclosed by the housing 41; the processor 42 and the memory 43 are disposed on the circuit board 44; the power supply circuit 45 is configured for supplying power for various circuits or components of the electronic device; the memory 43 is configured for storing executable program codes; and the processor 42 performs the method for controlling a synchronous output of a digital matrix according to any of the above embodiments of the present application by executing executable program codes stored in the memory 43.

For the specific execution of the foregoing steps by the processor 42 and the steps performed further by the processor 42 by executing the executable program code, reference can be made to the description of the embodiments shown in FIGS. 1-8 of the present application, and details are not repeated herein.

By applying this embodiment, the processor of the electronic device executes the executable program codes stored in the memory, so as to perform the methods for controlling a synchronous output of a digital matrix according to the embodiments of the present application, thereby realizing the synchronous outputs of the output units. Even if an output start time and an output period of an individual output unit cannot be calibrated, only the output of this output unit is not in synchronization with other output units, which does not affect the synchronization of the outputs of other output units. Therefore, the problem that the displayed contents of all of the video output units are not synchronized when the existing synchronous processing control unit fails to normally receive a synchronization request signal sent by an individual video output unit, can be solved.

The electronic device exists in a variety of forms including, but not limited to:

(1) Mobile communication devices: these devices are characterized by mobile communication functions and are mainly aimed at providing voice and data communication. Such terminals include smart phones (such as iPhone), multimedia phones, functional phones, and low-end phones.

(2) Ultra-mobile PC devices: these devices belong to the category of personal computers, have computing and processing functions, and generally have mobile Internet access. Such terminals include PDAs, MIDs, and UMPC devices, such as the iPad.

(3) Portable entertainment devices: these devices can display and play multimedia content. Such devices include audio, video players (such as iPod), handheld game consoles, e-books, smart toys and portable onboard navigation devices.

(4) Server: the server provides computing services. The server consists of a processor, a hard disk, a memory, a system bus, etc. The server has a similar architecture to that of a general-purpose computer, but higher requirements are imposed on processing power, stability, reliability, security, scalability, and manageability due to highly reliable services.

(5) Other electronic devices with data interaction capabilities.

An embodiment of the present application further provides executable program codes, wherein the executable program codes, when executed, perform the method for controlling a synchronous output of a digital matrix according to any of the embodiments of the present application.

By applying this embodiment, the executable program codes perform the methods for controlling a synchronous output of a digital matrix according to the embodiments of the present application when being executed, thereby realizing the synchronous outputs of the output units. Even if an output start time and an output period of an individual output unit cannot be calibrated, only the output of this output unit is not in synchronization with other output units, which does not affect the synchronization of the outputs of other output units. Therefore, the problem that the displayed contents of all of the video output units are not synchronized when the existing synchronous processing control unit fails to normally receive a synchronization request signal sent by an individual video output unit, can be solved.

An embodiment of the present application provides a storage medium for storing executable program codes, wherein the executable program codes, when executed, perform the method for controlling a synchronous output of a digital matrix according to any one of the foregoing embodiments of the present application.

By applying this embodiment, the storage medium stores executable program codes that perform the methods for controlling a synchronous output of a digital matrix according to the embodiments of the present application when being executed, thereby realizing the synchronous outputs of the output units. Even if an output start time and an output period of an individual output unit cannot be calibrated, only the output of this output unit is not in synchronization with other output units, which does not affect the synchronization of the outputs of other output units. Therefore, the problem that the displayed contents of all of the video output units are not synchronized when the existing synchronous processing control unit fails to normally receive a synchronization request signal sent by an individual video output unit, can be solved.

It can be understood by a person skilled in the art that all or a part of steps in the implementations of the above method can be accomplished by instructing related hardware through program, which can be stored in a computer-readable storage medium. When the program is executed, one or a combination of the steps of the method embodiments is included therein.

For the convenience of description, the above apparatus is divided into various units/modules. Of course, the functions of respective units/modules may be implemented in the same software or multiple softwares and/or hardwares when the present application is implemented.

It will be apparent to those skilled in the art from the above description of the embodiments that the present application can be implemented by means of a software and a necessary general hardware platform. In view of this, the technical solution of the present application may be embodied in the form of a software product in essence or the part that contributes to the related art may be embodied in the form of a software product, which may be stored in a storage medium such as a ROM/RAM or a disk, an optical disk, etc., and which includes instructions for causing a computer device (which may be a personal computer, server, or network device, etc.) to perform the methods described in various embodiments of the present application or portions of the embodiments.

One of ordinary skill in the art can understand that the entire method or a part of method can be completed by instructing a related hardware through a program, which can be stored in a computer readable storage medium. When the program is executed, the flow of embodiments of the methods as described above may be included therein. The storage medium may be a magnetic disk, an optical disk, a read-only memory (ROM), a random access memory (RAM), or the like.

The embodiments described above are simply preferable embodiments of the present application, and are not intended to limit the scope of protection of the present application. Any modification or replacement that can be easily conceived by those skilled in the art within the technical scope disclosed by the present application should fall within the protection scope of this application. Therefore, the protection scope of this application should be determined by the protection scope of the claims.

The invention claimed is:

1. A method for controlling a synchronous output of a digital matrix, including:
when an individual output unit in the output units is re-activated after an abnormality occurs in this individual output unit, calibrating output start times and output periods of the output units such that the output start times of the output units are identical and the output periods of the output units are identical;
receiving, by the output units, to-be-processed data based on the identical output start times; and
after the to-be-processed data is received, controlling the output units to complete the processing of the received to-be-processed data within a current output period, such that the output units output the processed data synchronously in a next output period, wherein the current output period and the next output period are continuous in time, calibrating output start times and output periods of the output units such that the output start times of the output units are identical and the output periods of the output units are identical comprises:
broadcasting and configuring configuration parameters of the output units, such that the output periods of the output units are identical; and
broadcasting an activation signal to the output units, and controlling the output units to simultaneously activate an output time sequence, such that the output start times of the output units are identical,
broadcasting and configuring configuration parameters of the output units such that the output periods of the output units are identical comprises:
triggering the broadcasting of the configuration parameters of the output units by automatic detection;
controlling the configuration parameters of the output units to be reset; and
controlling the output units to simultaneously configure the broadcasted configuration parameters, wherein the configuration parameters of the output units are reset to the default values first and then reconsidered.

2. The method for controlling a synchronous output of a digital matrix according to claim 1, wherein, calibrating output start times and output periods of the output units such that the output start times of the output units are identical and the output periods of the output units are identical comprises:
determining, according to a synchronous output group identifier to which each of the output units belongs, a synchronous output group to which each of the output units belongs;
broadcasting and configuring configuration parameters of output units in each of different synchronous output groups, such that output periods of the output units in this synchronous output group are identical; and
broadcasting an activation signal to the output units in each of different synchronous output groups, and controlling the output units in this synchronous output group to simultaneously activate an output time sequence, such that the output start times of the output units in this synchronous output group are identical.

3. The method for controlling a synchronous output of a digital matrix according to claim 2, wherein, receiving, by the output units, to-be-processed data based on the identical output start times comprises:
controlling the output units in each of the synchronous output groups to simultaneously generate an output interruption based on the identical output start times; and
when the output units in each of the synchronous output groups simultaneously generate the output interruption, synchronously triggering the output units in the synchronous output group to simultaneously receive respective to-be-processed data.

4. The method for controlling a synchronous output of a digital matrix according to claim 2, wherein, the to-be-processed data is video frame divided blocks;
the step of receiving, by the output units, to-be-processed data based on the identical output start times comprises:
transmitting the video frame divided blocks, and transmitting control information corresponding to the video frame divided blocks in broadcast manner;
controlling the output units in each of the synchronous output groups to simultaneously generate an output interruption based on the identical output start times; and
when the output units in each of the synchronous output groups simultaneously generate the output interruption, synchronously triggering the output units in the synchronous output group to simultaneously acquire respective video frame divided blocks and control information corresponding to the video frame divided blocks.

5. The method for controlling a synchronous output of a digital matrix according to claim 2, wherein, controlling the output units to complete the processing of the received to-be-processed data within a current output period, such that the output units output the processed data synchronously in a next output period comprises:
controlling the output units in each of the synchronous output groups to complete the processing of the received to-be-processed data within a current output period, such that the output units in the synchronous output group output the processed data synchronously in a next output period.

6. The method for controlling a synchronous output of a digital matrix according to claim 5, wherein, controlling the output units in each of the synchronous output groups to complete the processing of the received to-be-processed data within a current output period, such that the output units in the synchronous output group output the processed data synchronously in a next output period comprises:
if the output units in the synchronous output group simultaneously receive respective to-be-processed data, completing, by the output units in the synchronous output group, the processing of the respective to-be-processed data before simultaneously generating a next output interruption, so as to trigger the output units in the synchronous output group to synchronously output data which has been processed completely in a previous period when the output units in the synchronous output group simultaneously generate the next output interruption;
wherein, when the output units in the synchronous output group simultaneously generate an output interruption, the output units in the synchronous output group start a new output period.

7. The method for controlling a synchronous output of a digital matrix according to claim 6, wherein, the to-be-processed data comprises a video frame, an audio frame, or a control data set;

the method further comprises:
- in case the to-be-processed data is a video frame or an audio frame, if the output units in the synchronous output group do not simultaneously receive respective video frames or audio frames, outputting previously outputted video frames or audio frames synchronously when the output units in the synchronous output group simultaneously generate the next output interruption; and
- in case the to-be-processed data is control data, if the output units in the synchronous output group do not simultaneously receive respective control data, outputting preset invalid control data or outputting no control data when the output units in the synchronous output group simultaneously generate the next output interruption.

8. The method for controlling a synchronous output of a digital matrix according to claim 5, wherein, the to-be-processed data is video frame divided blocks;
the step of controlling the output units in each of the synchronous output groups to complete the processing of the received to-be-processed data within a current output period, such that the output units in the synchronous output group output the processed data synchronously in a next output period comprises:
- if the output units in the synchronous output group simultaneously acquire respective video frame divided blocks and control information corresponding to the video frame divided blocks, completing, by the output units in the synchronous output group, the processing of the respective video frame divided blocks before simultaneously generating a next output interruption, so as to trigger the output units in the synchronous output group synchronously output a video frame which has been processed completely in a previous output period when the output units in the synchronous output group simultaneously generate the next output interruption; and
- if the output units in the synchronous output group do not simultaneously acquire respective video frame divided blocks and control information corresponding to the video frame divided blocks, synchronously outputting the previously outputted video frame divided blocks when the output units in the synchronous output group simultaneously generate the next output interruption;

wherein, when the output units in the synchronous output group simultaneously generate an output interruption, the output units in the synchronous output group start a new output period.

9. The method for controlling a synchronous output of a digital matrix according to claim 2, further comprising:
controlling reference clocks of the output units in each of the synchronous output groups when the output units in the synchronous output group are operating, such that the reference clocks of the output units in the synchronous output group are identical in phase and frequency.

10. An electronic device, comprising a housing, a processor, a memory, a circuit board, and a power supply circuit, wherein the circuit board is disposed inside a space enclosed by the housing; the processor and the memory are disposed on the circuit board;
the power supply circuit is configured for supplying power for various circuits or components of the electronic device; the memory is configured for storing executable program codes; and the processor performs the method for controlling a synchronous output of a digital matrix according to claim 1 by executing executable program codes stored in the memory.

11. A storage medium for storing executable program codes, wherein the executable program codes, when executed, perform the method for controlling a synchronous output of a digital matrix according to claim 1.

* * * * *